US012673845B2

(12) United States Patent　　　　　(10) Patent No.: US 12,673,845 B2

Laurila et al.　　　　　　　　　　　　(45) Date of Patent: Jul. 7, 2026

(54) ACCESS CONTROL SYSTEM, AN ELEVATOR SYSTEM, AND A METHOD FOR CONTROLLING AN ACCESS CONTROL SYSTEM

(71) Applicant: KONE Corporation, Helsinki (FI)

(72) Inventors: Jussi Laurila, Helsinki (FI); Visa Rauta, Helsinki (FI)

(73) Assignee: KONE CORPORATION, Helsinki (FI)

( * ) Notice: Subject to any disclaimer, the term of this patent is extended or adjusted under 35 U.S.C. 154(b) by 972 days.

(21) Appl. No.: 17/941,645

(22) Filed: Sep. 9, 2022

(65) Prior Publication Data

US 2023/0002189 A1　　　Jan. 5, 2023

Related U.S. Application Data

(63) Continuation of application No. PCT/FI2020/050244, filed on Apr. 15, 2020.

(51) Int. Cl.
　　*B66B 1/46*　　　　　(2006.01)
　　*B66B 1/34*　　　　　(2006.01)
　　*B66B 3/00*　　　　　(2006.01)
　　*G06V 40/16*　　　　(2022.01)

(52) U.S. Cl.
　　CPC ............ *B66B 1/468* (2013.01); *B66B 1/3461* (2013.01); *B66B 3/006* (2013.01);
　　　　　　　　　　　(Continued)

(58) Field of Classification Search
　　CPC .... B66B 2201/4676; B66B 2201/4638; B66B 2201/4615; B66B 2201/403;
　　　　　　　　　　　(Continued)

(56) References Cited

FOREIGN PATENT DOCUMENTS

| JP | 2012-185634 A | 9/2012 |
| JP | 2016-84195 A | 5/2016 |

(Continued)

OTHER PUBLICATIONS

Takahashi et al. (JP 2012185634 A) Electronic Device (Year: 2012).*

(Continued)

*Primary Examiner* — Jorge L Carrasquillo

(74) *Attorney, Agent, or Firm* — Birch, Stewart, Kolasch & Birch, LLP

(57)　　　　　　ABSTRACT

An access control system for an elevator system includes a gate device allowing access for users via the gate device, at least one imaging device for obtaining image data, at least one sensor device for obtaining sensor data, at least one indication device, and a control unit. The control unit is configured to: receive the image data from the at least one imaging device, detect a user approaching the gate device based on the received image data, obtain destination floor information including at least two destination floors, control the at least one indication device to generate a first visual indication including the at least two destination floors, and detect a destination floor selected by the user from among the at least two destination floors based on sensor data received from the at least one sensor device. An elevator system includes an access control system and to a method for controlling an access control system is disclosed.

23 Claims, 5 Drawing Sheets

(52) U.S. Cl.
CPC ... *B66B 2201/103* (2013.01); *B66B 2201/104* (2013.01); *B66B 2201/401* (2013.01); *B66B 2201/402* (2013.01); *B66B 2201/403* (2013.01); *B66B 2201/4615* (2013.01); *B66B 2201/4638* (2013.01); *B66B 2201/4676* (2013.01); *G06V 40/172* (2022.01)

(58) Field of Classification Search
CPC ........ B66B 2201/402; B66B 2201/401; B66B 2201/104; B66B 2201/103; B66B 3/006; B66B 1/3461; B66B 1/468; G06V 40/172
USPC ....................................................... 187/382
See application file for complete search history.

(56) References Cited

FOREIGN PATENT DOCUMENTS

| | | |
|---|---|---|
| JP | 2017-30891 A | 2/2017 |
| JP | 2019-142710 A | 8/2019 |
| WO | WO 2012/120960 A1 | 9/2012 |
| WO | WO 2015/034459 A1 | 3/2015 |

OTHER PUBLICATIONS

Sudo (JP 2016084195 A). Elevator System And Destination Floor Registration Control Method (Year: 2016).*
Gerstenmeyer et al. (CN 106660737 B) Method For Controlling An Elevator Device (Year: 2018).*
Bahjat et al. (ES 2402415 T5) Programmable Adaptive Touch Screen Lift Call Devices (Year: 2017).*
Office Action issued in Chinese Application No. 202080099722.0 on Apr. 16, 2025.
International Search Report, issued in PCT/FI2020/050244, dated Jan. 15, 2021.
Written Opinion of the International Searching Authority, issued in PCT/FI2020/050244, dated Jan. 15, 2021.
English translation of the Chinese Office Action and Search Report for Chinese Application No. 202080099722.0, dated Mar. 13, 2024.

* cited by examiner

302 — Receiving image data

304 — Detecting a user

306 — Obtaining destination floor information

308 — Providing a first visual indication

310 — Detecting a destination floor selected by the user

Communication unit
430

425

Memory unit
420

Processing unit
410

UI
440

110

ACCESS CONTROL SYSTEM, AN ELEVATOR SYSTEM, AND A METHOD FOR CONTROLLING AN ACCESS CONTROL SYSTEM

CROSS REFERENCE TO RELATED APPLICATIONS

This application is a Continuation of PCT International Application No. PCT/FI2020/050244, filed on Apr. 15, 2020, which is hereby expressly incorporated by reference into the present application.

TECHNICAL FIELD

The invention concerns in general the technical field of access control. Especially the invention concerns access control of elevators.

BACKGROUND

Typically, gate devices, such as security gates and turnstiles, may comprise access control. The access control enables that only authorized users may have access through the gate device. The access control may be based on using keycards; tags; identification codes; such as personal identity number (PIN) code, ID number; and/or biometric technologies, such as fingerprint, facial recognition, iris recognition, retinal scan, voice recognition, etc. The gate devices may be communicatively coupled to an elevator system enabling a generation of an elevator call in response to identification of an authorized user with the gate device.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present an access control system, an elevator system, and a method for controlling an access control system. Another objective of the invention is that the access control system, the elevator system, and the method for controlling an access control system enable an effortless selection of a destination floor.

The objectives of the invention are reached by an access control system, an elevator system, and a method as defined by the respective independent claims.

According to a first aspect, an access control system for an elevator system is provided, wherein the access control system comprises: a gate device allowing access for users via the gate device, at least one imaging device for obtaining image data, at least one sensor device for obtaining sensor data, at least one indication device, and a control unit configured to: receive the image data from the at least one imaging device, detect a user approaching the gate device based on the received image data, obtain destination floor information comprising at least two destination floors, control the at least one indication device to generate a first visual indication comprising the at least two destination floors, and detect a destination floor selected by the user from among the at least two destination floors based on sensor data received from the at least one sensor device.

The generation of the first visual indication may comprise projection of the first visual indication on a surface in a vicinity of the gate device, the first visual indication may comprise an indication element for each of the at least two destination floors.

The detection of the destination floor selected by the user may comprise detection of at least partial deformation of at least one indication element, wherein if one indication element with at least partial deformation is detected, said one indication element may represent the destination floor selected by the user; or if two or more indication elements with at least partial deformation are detected, the indication element with a greater deformation may represent the destination floor selected by the user, or no selection by the user is detected.

Alternatively or in addition, the control unit may be configured to provide the detected destination floor selection by the user to an external database and/or an elevator control system.

The elevator control system may be configured to generate an elevator call to allocate an elevator car to the destination floor selected by the user in response to receiving the detected destination floor selection by the user from the control unit.

The control unit may further be configured to receive an elevator car identification information of the elevator car to which an elevator call is generated from the elevator control system.

Alternatively, the control unit may further be configured to provide to the elevator control system an elevator car identification information of an elevator car for generating an elevator call to allocate said elevator car to the destination floor selected by the user.

The control unit may further be configured to control the at least one indication device to project a second visual indication on a surface in a vicinity of the gate device or the user, wherein the second visual indication may comprise the elevator car identification information; and/or wherein the system may further comprise one or more displays, and the control unit may be configured to control the one or more displays to display the elevator car identification information.

The at least two destination floors may comprise one or more default destination floors defined based on a time of day, one or more destination floors defined based on a current traffic flow, and/or one or more destination floors defined based on an exceptional situation.

The detection of the user may further comprise identification of an authorized user based on the received image data and prestored data associated with the authorized users by using facial recognition-based identification.

Furthermore, the at least two destination floors comprise: one or more default destination floors defined based on a time of day, one or more destination floors defined based on a current traffic flow, one or more destination floors defined based on an exceptional situation, one or more default destination floors assigned for said authorized user, one or more destination floors set by the said authorized user, one or more destination floors defined based on previously selected destination floors by said authorized user, and/or a destination floor defined based on a scheduled event for said authorized user, wherein the scheduled event is obtained from an external storage unit to which the scheduled event is stored.

According to a second aspect, an elevator system is provided, wherein the elevator system comprises: at least two elevator cars each travelling along a respective elevator shaft, an elevator control system, and an access control system as described above comprising at least one gate device.

According to a third aspect, A method for controlling an access control system is provided, wherein the method comprises: receiving image data from at least one imaging device, detecting a user approaching a gate device based on the received image data, obtaining destination floor information comprising at least two destination floors, controlling at least one indication device to provide a first visual indication comprising the at least two destination floors, and detecting a destination floor selected by the user from among the at least two destination floors based on sensor data received from at least one sensor device.

The providing of the first visual indication may comprise projecting the first visual indication on a surface in a vicinity of the gate device, the first visual indication may comprise an indication element for each of the at least two destination floors.

The detecting the destination floor selected by the user may comprise detecting at least partial deformation of at least one indication element, wherein if one indication element with at least partial deformation is detected, said one indication element may represent the destination floor selected by the user; or if two or more indication elements with at least partial deformation are detected, the indication element with a greater deformation may represent the destination floor selected by the user, or no selection by the user is detected.

The method may further comprise providing the detected destination floor selection by the user to an external database and/or an elevator control system.

The method may further comprise generating an elevator call to allocate an elevator car to the destination floor selected by the user in response to receiving the detected destination floor selection by the user.

The method may further comprise receiving an elevator car identification information of the elevator car to which an elevator call is generated from the elevator control system.

The method may further comprise providing to the elevator control system an elevator car identification information of an elevator car for generating an elevator call to allocate said elevator car to the destination floor selected by the user.

The method may further comprise: controlling the at least one indication device to project a second visual indication on a surface in a vicinity of the gate device or the user, wherein the second visual indication comprises the elevator car identification information, and/or controlling one or more displays to display the elevator car identification information.

The at least two destination floors may comprise: one or more default destination floors defined based on a time of day, one or more destination floors defined based on a current traffic flow, and/or one or more destination floors defined based on an exceptional situation.

The step of detecting the user may further comprise identifying an authorized user based on the received image data and prestored data associated with authorized users by using facial recognition-based identification.

Furthermore, the at least two destination floors may comprise: one or more default destination floors defined based on a time of day, one or more destination floors defined based on a current traffic flow, one or more destination floors defined based on an exceptional situation, one or more default destination floors assigned for said authorized user, one or more destination floors set by the said authorized user, one or more destination floors defined based on previously selected destination floors by said authorized user, and/or a destination floor defined based on a scheduled event for said authorized user, wherein the scheduled event is obtained from an external storage unit to which the scheduled event is stored.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1:
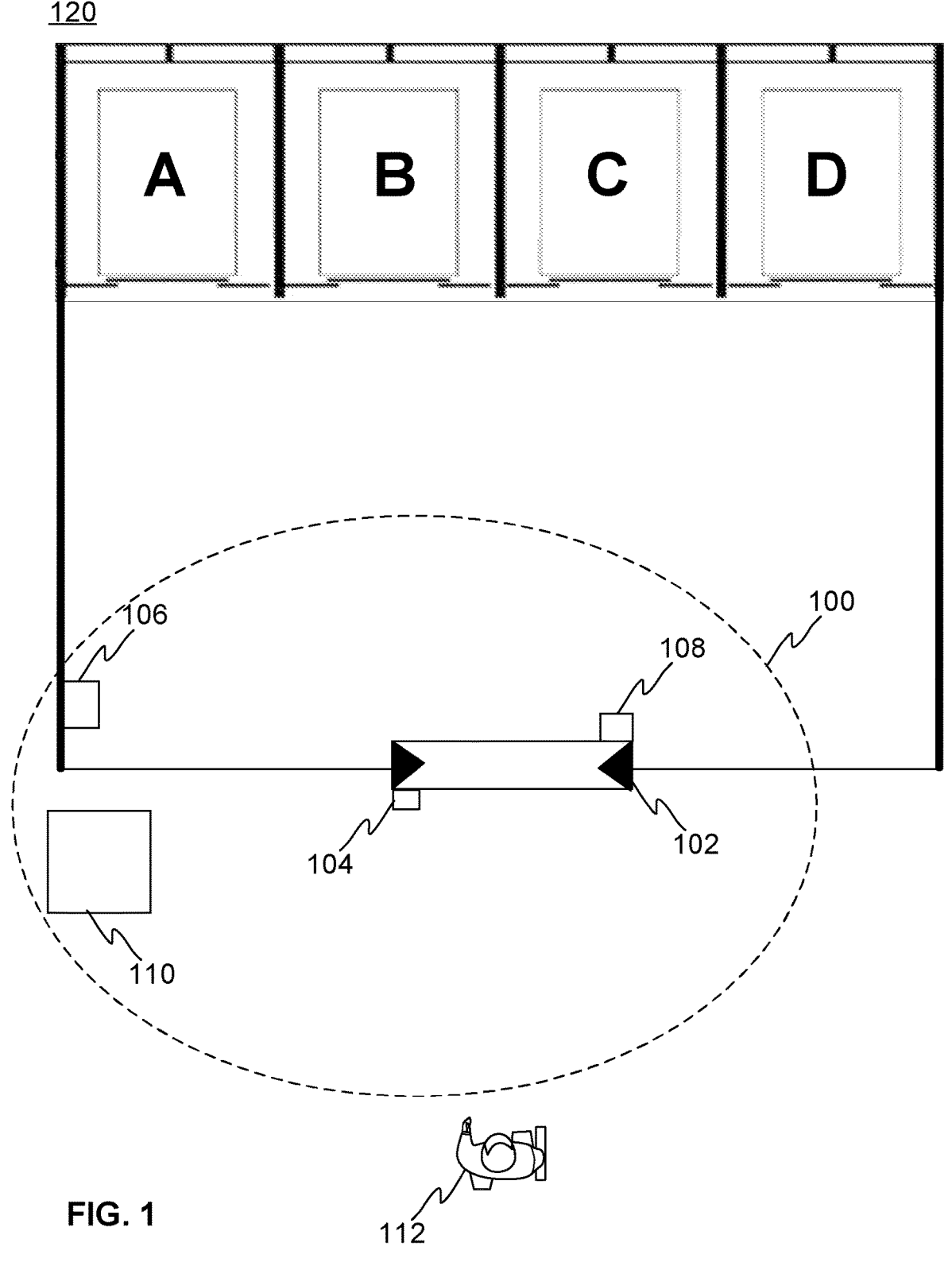
FIG. 1 illustrates schematically an example environment according to the invention, wherein different embodiments according to the invention may be implemented.

FIG. 1 illustrates schematically an example environment according to the invention, wherein an access control system 100 according to the invention may be implemented. The example environment is an elevator environment, i.e. an elevator system 120. The elevator system 120 may comprise at least two elevator cars A-D each travelling along a respective elevator shaft, an elevator control system (for sake of clarity not shown in FIG. 1), and an access control system 100 according to the invention. The elevator control system may be configured to control the operations of the elevator system 120, e.g. generate elevator call(s) to allocate the elevator cars A-D. The elevator control system may locate in a machine room of the elevator system 120 or in one of landings. The access control system 100 comprises at least one gate device 102 allowing access for users 112 via the at least one gate device 102, at least one imaging device 104 for obtaining image data, at least one sensor device 106 for obtaining sensor data, at least one indication device 108, and a control unit 110. The invention is described next by using one gate device 102. However, the invention is not limited to that and the access control system 100 according to the invention may comprise more than one gate device 102 each configured to operate as will be described by referring to the one gate device 102.

The at least one imaging device 104 may comprise an optical imaging device, e.g. at least one camera. The at least one imaging device 104 may enable detection and/or identification of a user 112 at a distance away from the gate device 102. The distance may be e.g. between 0 to 10 meters from the gate device 102 and preferably between 1 to 2 meters, 1 to 3 meters or 1 to 5 meters. The at least one imaging device 104 may be arranged to the gate device 102 as illustrated in the example of FIG. 1 or in a vicinity of, i.e. close to, the gate device 102, e.g. to a wall, a ceiling and/or to a separate support device.

The control unit 110 may be external entity or it may be implemented as a part of the gate device 102. In the example of FIG. 1, the control unit 110 is an external entity. The external entity herein means an entity that locates separate from the gate device 102. The implementation of the external control unit 110 may be done as a stand-alone entity or as a distributed computing environment between a plurality of stand-alone devices, such as a plurality of servers providing distributed computing resource. The control unit 110 may be configured to control the operations of the access control system 100. The control unit 110 may be communicatively coupled to the gate device 102, the at least one imaging device 104, the at least one sensor device 106 and the at least one indication device 108. The communication between the control unit 110 and the other entities of the system may be based on one or more known communication technologies, either wired or wireless.

The control unit 110 is configured to receive the image data from the at least one imaging device 104 and detect a user 112 approaching the gate device 102 based on the received image data. In response to detection of the user 112 approaching the gate device 102, the control unit 102 is configured to obtain destination floor information comprising at least two destination floors. The process of obtaining the destination floor information may depend on whether the user 112 is identified as an authorized user or not. If the user 112 is not identified as an authorized user, e.g. any user entering a building in which the elevator system 120 resides, the at least two destination floors may comprise one or more default destination floors defined based on a time of day, one or more destination floors defined based on a current traffic flow, and/or one or more destination floors defined based on an exceptional situation, e.g. a fault state of one or more elevator cars A-D. The at least two destination floors may be obtained from a memory or a database connected to the control unit 110 or from a cloud service accessible via a network connection.

According to an example of the invention, the detection of the user 112 may further comprise identification of an authorized user based on the received image data and prestored data associated with the authorized users by using facial recognition-based identification. The control unit 110 may be configured to determine based on the received image data and prestored data associated with the authorized users, whether the image data relates to an authorized user or not. In other words, the received image data may be compared to the prestored data in order to find a possible match from the prestored data. The prestored data may be stored in a memory or database connected to the control unit 110, or in a cloud service accessible via a network connection. For example, if the access control system 100 is arranged in a building, image data relating to people regularly residing, e.g. working or living, in the building may have been prestored in the memory or database. For the authorized users the destination floors may be suggested more versatile. Moreover, for the authorized users 112 user specific destination floors may be obtained.

If the user 112 is identified as an authorized user, the at least two destination floors may comprise one or more default destination floors defined based on a time of day; one or more destination floors defined based on a current traffic flow; one or more destination floors defined based on an exceptional situation, e.g. a fault state of one or more elevator cars A-D; one or more default destination floors assigned for said authorized user; one or more destination floors set by the said authorized user; one or more destination floors defined based on previously selected destination floors by said authorized user; and/or a destination floor defined based on a scheduled event for said authorized user, wherein the scheduled event is obtained from an external storage unit, such as a database, to which the scheduled event is stored. For example, if a meeting in a specific floor is scheduled for said authorized user the at least two destination floors may comprise said specific floor to which the meeting is scheduled. The one or more default destination floors assigned for said authorized user may comprise e.g. a home floor and/or an office floor of said authorized user. The one or more destination floors set by the said authorized user may comprise any floor of the building predefined by said authorized user. According to an example, machine learning techniques may be used to define the one or more destination floors defined based on previously selected destination floors by said authorized user. The at least two destination floors may be obtained from a memory or a database connected to the control unit 110 or from a cloud service accessible via a network connection.

The gate device 102 may comprise a barrier device, such as door panel(s), turnstile, boom or any other barrier device, for preventing users without an access via the gate device 102. The gate device 102 may be by default at a state allowing an unrestricted access via the gate device 102. In other words, the gate device 102 is maintained at the state allowing the unrestricted access via the gate device 102. If the received image data relates to a user without an access via the gate device 102, the control unit 110 may be configured to control the barrier device to prevent, i.e. restrict, the access via the gate device 102, e.g. by closing the barrier device of the gate device 102. Alternatively, the gate device 102 may be by default at a state preventing, i.e. restricting, the access of the users via the gate device 102, i.e. the gate device 102 may be in a closed state. If the received image data do not relate to a user without an access via the gate device 102, the control unit 110 may be configured to control the barrier device to provide the access via the gate device 102, e.g. by opening the barrier device of the gate device 102.

The control unit 102 is further configured to control the at least one indication device 108 to generate a first visual indication for the user 112. The first visual indication comprises the obtained at least two destination floors. The at least one indication device 108 may comprise a projector device and the generation of the first visual indication may comprise projection, by the projection device, of the first visual indication on a surface in a vicinity of, i.e. close to, the gate device 102, e.g. in front of the gate device 102 viewed from the passage direction of the user 112 via the gate device 102 and/or on at least one assumed passage route of the user 112 passing through the gate device 102. The first visual indication may comprise an indication element 202a-202n for each of the at least two destination floors. The at least one indication device 108 may be arranged to the gate device 102 as illustrated in the example of FIG. 1 or in a vicinity of, i.e. close to, the gate device 102, e.g. to a wall, a ceiling and/or to a separate support device. Furthermore, the control unit 110 is configured to detect a destination floor selected by the user 112 from among the at least two destination floors based on sensor data received from the at least one sensor device 106. The at least one sensor device 106 may comprise an optical sensor, e.g. a camera, a detection system based on radio waves, e.g. a radar, and/or an indoor positioning system. The at least one sensor device 106 may be arranged to the gate device 102 or in a vicinity of, i.e. close to, the gate device 102, e.g. to a wall, a ceiling and/or to a separate support device. In the example of FIG. 1 the at least sensor device 106 is arrange to a wall. However, the invention is not limited to that and the at least one sensor device 106 may be arranged anywhere within the elevator environment 120 between the gate device 102 and the elevator cars A-D travelling along the elevator shafts so that the at least one sensor device 106 may detect the destination floor selected by the user 112.

According to an example of the invention, the detection of the destination floor selected by the user 112 may comprise detection of at least partial deformation of at least one indication element 202a-202n. The deformation at least partial deformation of at least one indication element 202a-202n may indicate that the user 112 passes over said at least one indication element 202a-202n in order to select the destination floor comprised in said at least one indication element 202a-202n. If one indication element 202a-202n with at least partial deformation is detected, said one indication element 202a-202n represents the destination floor selected by the user 112. Alternatively, if two or more indication elements 202a-202n with at least partial deformation are detected, the indication element 202a-202n with a greater deformation represents the destination floor selected by the user 112, or no selection by the user 112 is detected. For example, if the received sensor data indicates e.g. 40% deformation of one indication element 202a-202n, e.g. the indication element 202b, and e.g. 60% deformation of another indication element 202a-202n, e.g. the indication element 202b, the control unit 110 may detect, i.e. infer that the user has selected the indication element with the 60% deformation or the control unit 110 may detect that no selection by the user 112 is detected, because the selection by the user 112 is considered as unclear selection.

Figure 2A:
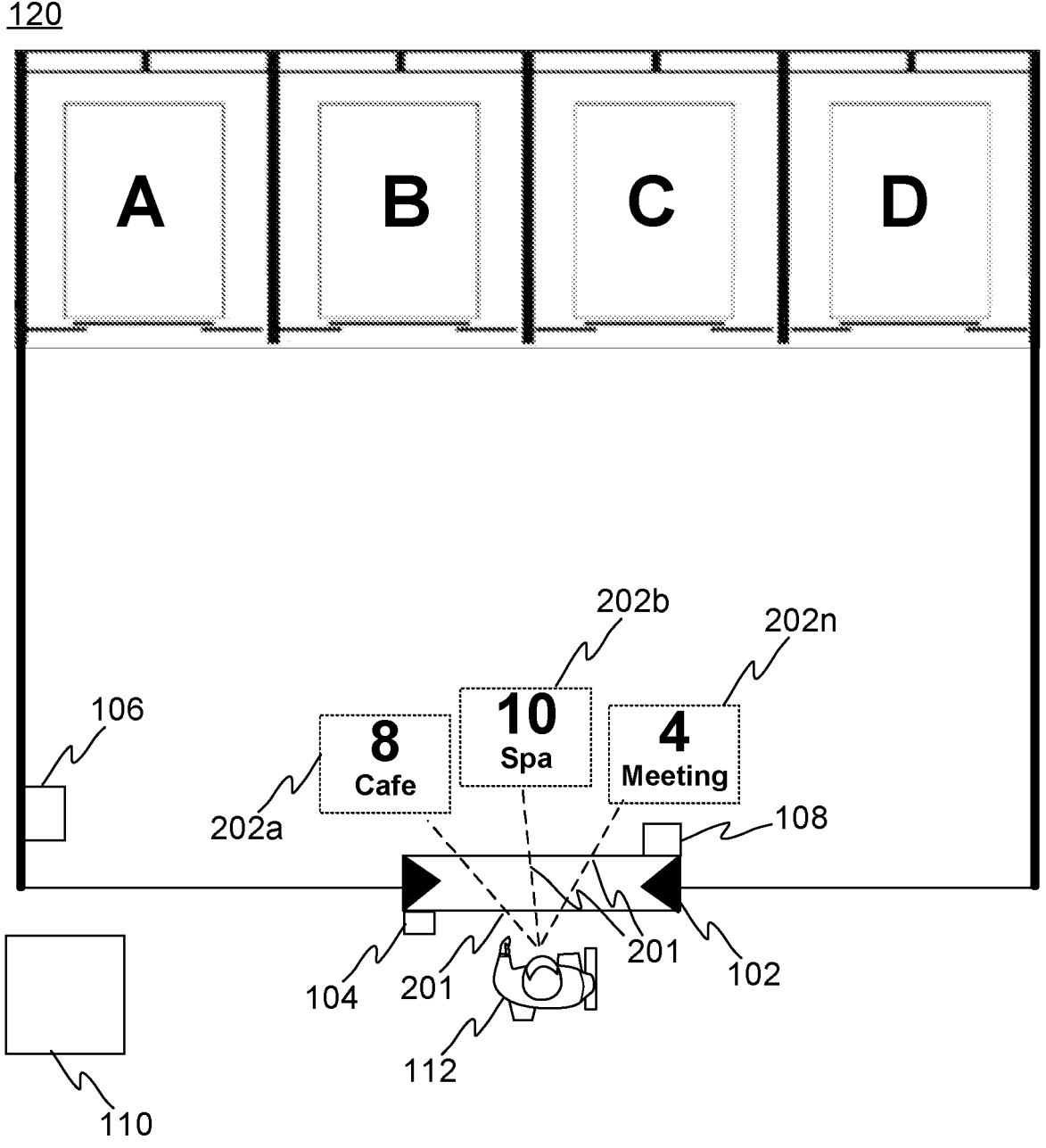
FIGS. 2A-2C illustrate schematically example situations according to the invention.

FIG. 2A illustrates a non-limiting example situation, wherein the control unit 110 is detected the user 112 approaching the gate device 102 based on the imaged data received from the at least one imaging device 104. In response to detection of the user 112 approaching the gate device 102, the control unit 102 is configured to obtain destination floor information comprising three destination floors in this example. The example destination floors are floor 8, where a café is located in this example, floor 10, where a spa is located in this example, and floor 4, where meeting rooms are located in this example. Moreover, in the example situation of FIG. 2A the control unit 102 is further configured to control the at least one indication device 108 to project the first visual indication on the surface in the vicinity of the gate device 102, e.g. at least one assumed passage route 201 of the user 112, wherein the first visual indication comprises three indication elements 202a-202n, i.e. one indication element 202a-202n for each of the three destination floor in this example. The indication element 202a for the floor 8, the indication element 202b for the floor 10, and the indication element 202c for the floor 4.

Figure 2B:
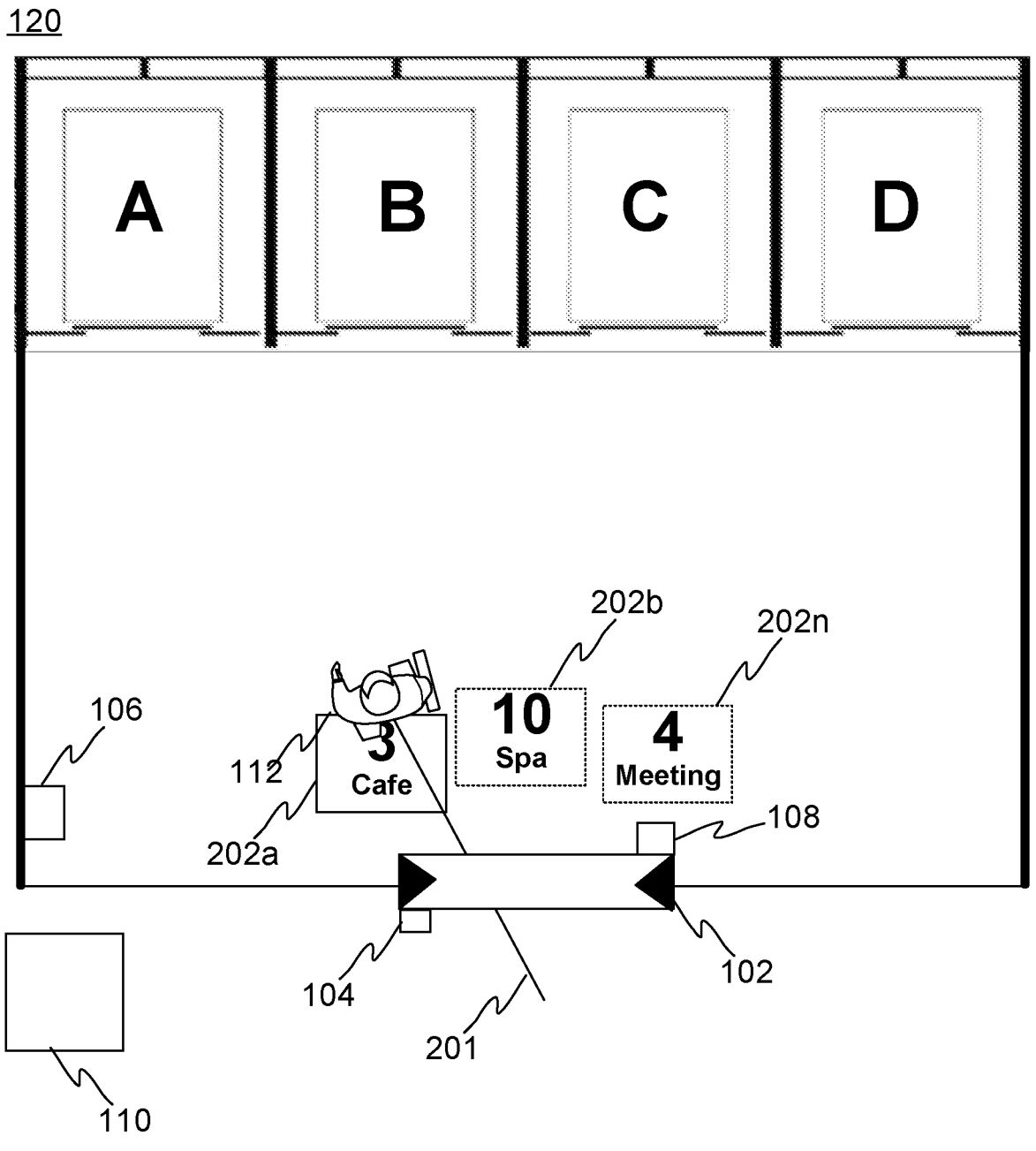

FIG. 2B illustrates a non-limiting example situation, wherein the user 112 is passing over the indication element 202a, i.e. the indication element for the floor 8, causing that at least partial deformation of the indication element 202a may detected based on the based on sensor data received from the at least one sensor device 106. This detection indicates that the user 112 has selected the destination floor 8 from among the three example destination floors. The line 201 illustrates a passage route of the user 112 along which the user 112 passes.

According to an example according to the invention, the control 110 unit may be configured to provide the detected destination floor selection by the user 112 to an external database and/or to the elevator control system. The elevator control system may be configured to generate an elevator call to allocate an elevator car A-D to the destination floor selected by the user 112 in response to receiving the detected destination floor selection by the user 112 from the control unit 110. The control unit 110 may further be configured to receive an elevator car identification information of the elevator car A-D to which an elevator call is generated from the elevator control system. This may be preferable especially in high-traffic situations, i.e. when a multiplicity of users is using the elevator system 120 at the same time, e.g. during rush hours. In the high-traffic situations an optimal allocation of the elevator cars A-D by the elevator control system is important in order to reduce a waiting time of the users.

Alternatively, the control unit 110 may be configured to provide to the elevator control system an elevator car identification information of an elevator car A-D for generating an elevator call to allocate said elevator car A-D to the destination floor selected by the user 112. This may be preferable especially in low-traffic situations, i.e. when only few users are using the elevator system 120. In the low-traffic situations the optimal allocation is not so important enabling that the elevator car A-D to be allocated to the destination floor selected by the user 112 may be decided by the control unit 110.

The control unit 110 may further be configured to control the at least one indication device 108 to project a second visual indication on a surface in a vicinity of the gate device 102 or the user 112, e.g. in front of the user viewed from the passage direction of the user 112, i.e. on the route 201 of the user 112, wherein the second visual indication may comprise an indication element 202a-202n indicating the elevator car identification information. Alternatively or in addition, when the system 100 further comprises one or more displays 204, the control unit 110 may be configured to control the one or more displays 204 to display the elevator car identification information for the user 112. This enables a simple way to inform the user 112 which elevator car A-D is allocated for the destination floor selected by the user 112 already when the user 112 is approaching the elevators A-D.

Figure 2C:
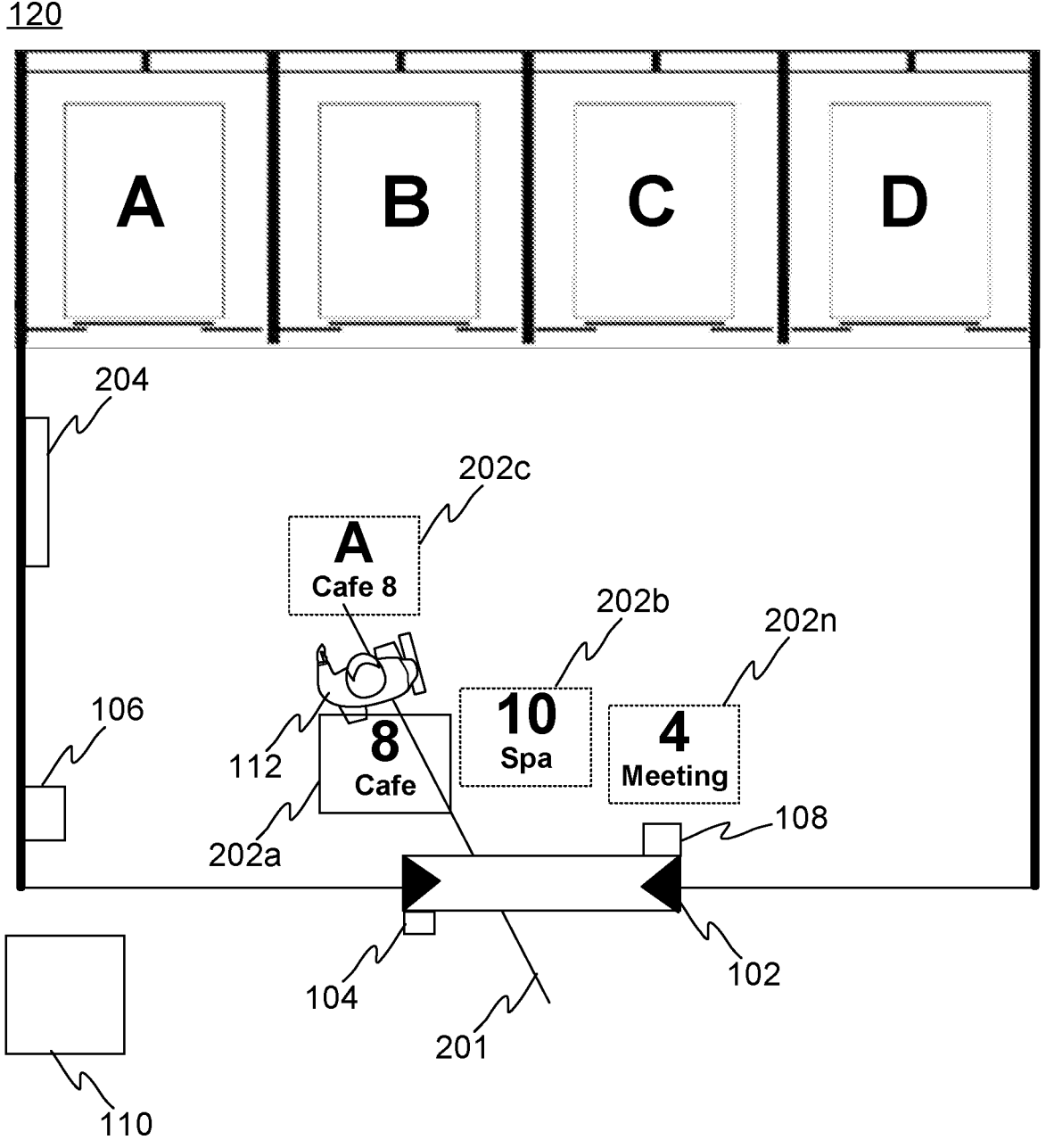

FIG. 2C illustrates a non-limiting example situation, wherein the second visual indication comprising the elevator identification information is projected in front of the user 112 with an indication element 202c. In addition, in the example of FIG. 2C the system 100 comprises a display 204 to display the elevator car identification information for the user 112. The example display 204 is arranged on a wall in a an elevator hallway, but the invention is not limited to that the one or more displays 204 may be located anywhere in the elevator hallway. In the example of FIG. 2C an elevator call to allocate the elevator car A to the destination floor selected by the user 112, i.e. the floor 8, is generated and projected in front of the user 112 with the indication element 202c.

Figure 3:
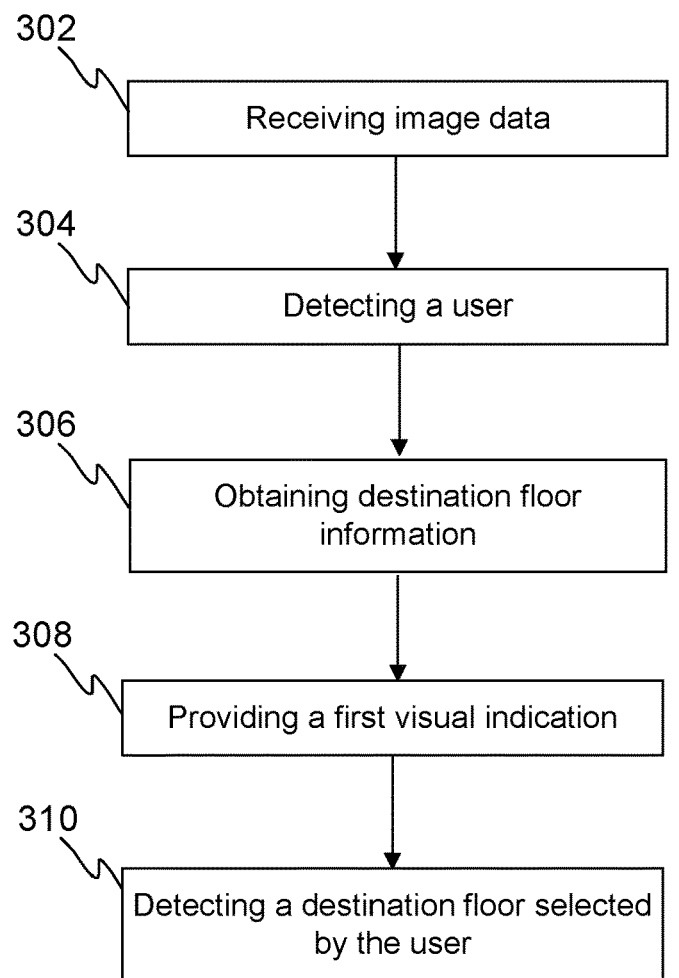
FIG. 3 illustrates schematically an example of a method according to the invention.

Next an example of the method according to the invention is described by referring to FIG. 3. FIG. 3 schematically illustrates the invention as a flow chart.

At a step 302, the control unit 110 receives image data from the at least one imaging device 104. At a step 304, the control unit 110 detects a user 112 approaching the gate device 102 based on the received image data.

At a step 306, in response to detection of the user 112 approaching the gate device 102, the control unit 102 obtains destination floor information comprising at least two destination floors. The process of obtaining the destination floor information may depend on whether the user is identified as an authorized user or not. If the user is not identified as an authorized user, e.g. any user entering a building in which the elevator system 120 resides, the at least two destination floors may comprise one or more default destination floors defined based on a time of day, one or more destination floors defined based on a current traffic flow, and/or one or more destination floors defined based on an exceptional situation, e.g. a fault state of one or more elevator cars A-D.

According to an example of the invention the detection of the user 112 at the step 304 may further comprise identification of an authorized user based on the received image data and prestored data associated with the authorized users by using facial recognition-based identification. The control unit 110 may determine based on the received image data and prestored data associated with the authorized, whether the image data relates to an authorized user or not. In other words, the received image data may be compared to the prestored data in order to find a possible match from the prestored data. The prestored data may be stored in a memory or database connected to the control unit 110, or in a cloud service accessible via a network connection. For example, if the access control system 100 is arranged in a building, image data relating to people regularly residing, e.g. working or living, in the building may have been prestored in the memory or database. For the authorized users the destination floors may be suggested more versatile. Moreover, for the authorized users 112 user specific destination floors may be obtained.

If the user 112 is identified as an authorized user, the at least two destination floors may comprise one or more default destination floors defined based on a time of day; one or more destination floors defined based on a current traffic flow; one or more destination floors defined based on an exceptional situation, e.g. a fault state of one or more elevator cars A-D; one or more default destination floors assigned for said authorized user; one or more destination floors set by the said authorized user; one or more destination floors defined based on previously selected destination floors by said authorized user; and/or a destination floor defined based on a scheduled event for said authorized user, wherein the scheduled event is obtained from an external storage unit, such as a database, to which the scheduled event is stored. For example, if a meeting in a specific floor is scheduled for said authorized user the at least two destination floors may comprise said specific floor to which the meeting is scheduled. The one or more default destination floors assigned for said authorized user may comprise e.g. a home floor and/or an office floor of said authorized user.

The one or more destination floors set by the said authorized user may comprise any floor of the building predefined by said authorized user. According to an example, machine learning techniques may be used to define the one or more destination floors defined based on previously selected destination floors by said authorized user. The at least two destination floors may be obtained from a memory or a database connected to the control unit 110 or from a cloud service accessible via a network connection.

At a step 308, the control unit 102 controls the at least one indication device 108 to generate a first visual indication for the user 112. The first visual indication comprises the obtained at least two destination floors. The first visual indication may comprise an indication element 202a-202n for each of the at least two destination floors.

At a step 310, the control unit 110 detects a destination floor selected by the user 112 from among the at least two destination floors based on sensor data received from the at least one sensor device 106. According to an example of the invention, the detection of the destination floor selected by the user may comprise detection of at least partial deformation of at least one indication element 202a-202n. The deformation at least partial deformation of at least one indication element 202a-202n may indicate that the user 112 passes over said at least one indication element 202a-202n in order to select the destination floor comprised in said at least one indication element 202a-202n. If one indication element 202a-202n with at least partial deformation is detected, said one indication element 202a-202n represents the destination floor selected by the user 112. Alternatively, if two or more indication elements 202a-202n with at least partial deformation are detected, the indication element 202a-202n with a greater deformation represents the destination floor selected by the user 112, or no selection by the user 112 is detected.

According to an example of the invention, the method may further comprise providing by the control unit 110 the detected destination floor selection by the user 112 to an external database and/or to the elevator control system. The elevator control system may generate an elevator call to allocate an elevator car A-D to the destination floor selected by the user 112 in response to receiving the detected destination floor selection by the user 112 from the control unit 110. The control unit 110 may further receive an elevator car identification information of the elevator car A-D to which an elevator call is generated from the elevator control system. This may be preferable especially in high-traffic situations as discussed above.

Alternatively, the method may further comprise providing by the control unit 110 to the elevator control system an elevator car identification information of an elevator car A-D for generating an elevator call to allocate said elevator car A-D to the destination floor selected by the user 112. This may be preferable especially in low-traffic situations as discussed above.

According to an example of the invention, the method may further comprise controlling by the control unit 110 the at least one indication device 108 to project a second visual indication on a surface in a vicinity of the user 112, e.g. in front of the user 112, i.e. on the route 201 of the user 112, wherein the second visual indication may comprise an indication element 202a-202n indicating the elevator car identification information. Alternatively or in addition, when the system 100 further comprises one or more displays 204, the control unit 110 may be configured to control the one or more displays 204 to display the elevator car identification information for the user 112. This enables a simple way to inform the user 112 which elevator car A-D is allocated for the destination floor selected by the user 112 already when the user 112 is approaching the elevators A-D.

Figure 4:
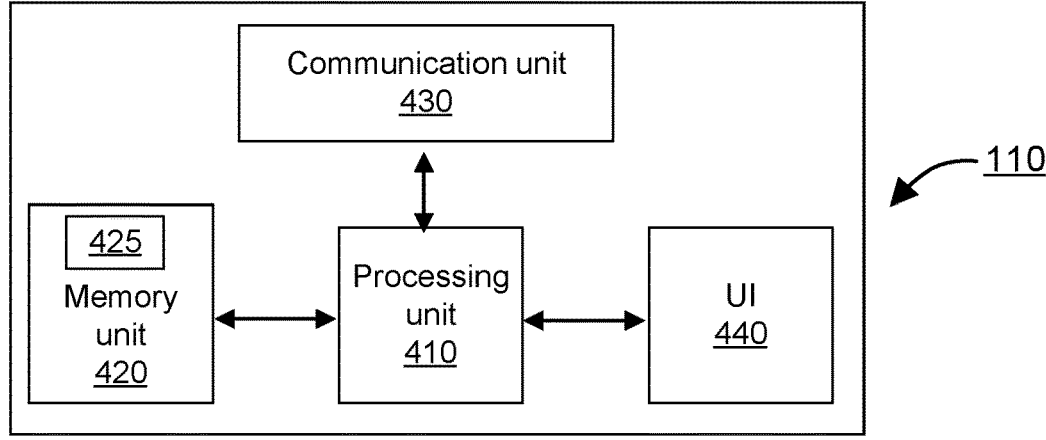
FIG. 4 illustrates schematically an example of components of a control unit according to the invention.

FIG. 4 schematically illustrates an example of components of the control unit 110 according to the invention. The control unit 110 may comprise a processing unit 410 comprising one or more processors, a memory unit 420 comprising one or more memories, a communication unit 430 comprising one or more communication devices, and possibly a user interface (UI) unit 450. The memory unit 420 may store portions of computer program code 425 and any other data, and the processing unit 410 may cause the control unit 110 to operate as described by executing at least some portions of the computer program code 425 stored in the memory unit 420. The communication unit 430 may be based on at least one known communication technologies, either wired or wireless, in order to exchange pieces of information as described earlier. The communication unit 430 provides an interface for communication with any external unit, such as the gate device 102, the at least one imaging device 104, the at least one sensor device 106 and the at least one indication device 108, the elevator control system, database and/or any external systems. The communication unit 430 may comprise one or more communication devices, e.g. radio transceiver, antenna, etc. The user interface 440 may comprise I/O devices, such as buttons, keyboard, touch screen, microphone, loudspeaker, display and so on, for receiving input and outputting information. The computer program 425 may be stored in a non-statutory tangible computer readable medium, e.g. an USB stick or a CD-ROM disc.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An access control system for an elevator system comprising:
   a gate device allowing access for users via the gate device;
   at least one imaging device for obtaining image data;
   at least one sensor device for obtaining sensor data;
   at least one indication device; and
   a control unit configured to:
      receive the image data from the at least one imaging device;
      detect a user approaching the gate device based on the received image data;
      obtain destination floor information comprising at least two destination floors;
      control the at least one indication device to generate a first visual indication comprising at least two indication elements, the at least two indication elements indicating the at least two destination floors, respectively; and
      detect a destination floor selected by the user from among the at least two destination floors based on sensor data received from the at least one sensor device, the sensor data indicating deformation of at least one of the at least two indication elements caused by the user passing over the first visual indication.

2. The access control system according to claim 1, wherein the generation of the first visual indication comprises projection of the first visual indication on a surface in a vicinity of the gate device, and wherein the first visual indication comprises an indication element for each of the at least two destination floors.

3. The access control system according to claim 2, wherein the detection of the destination floor selected by the user comprises detection of at least partial deformation of at least one indication element, wherein:
   if one indication element with at least partial deformation is detected, said one indication element represents the destination floor selected by the user; or
   if two or more indication elements with at least partial deformation are detected, the indication element with a greater deformation represents the destination floor selected by the user, or no selection by the user is detected.

4. The access control system according to claim 1, wherein the control unit is configured to provide the detected destination floor selection by the user to an external database and/or an elevator control system.

5. The access control system according to claim 4, wherein the elevator control system is configured to generate an elevator call to allocate an elevator car to the destination floor selected by the user in response to receiving the detected destination floor selection by the user from the control unit.

6. The access control system according to claim 5, wherein the control unit is further configured to receive an elevator car identification information of the elevator car to which an elevator call is generated from the elevator control system.

7. The access control system according to claim 4, wherein the control unit is further configured to provide to the elevator control system an elevator car identification information of an elevator car for generating an elevator call to allocate said elevator car to the destination floor selected by the user.

8. The access control system according to claim 6, wherein the control unit is further configured to control the at least one indication device to project a second visual indication on a surface in a vicinity of the gate device or the user, wherein the second visual indication comprises the elevator car identification information; and/or
   wherein the system further comprises one or more displays, and the control unit is configured to control the one or more displays to display the elevator car identification information.

9. The access control system according to claim 1, wherein the at least two destination floors comprise:
   one or more default destination floors defined based on a time of day;
   one or more destination floors defined based on a current traffic flow; and/or
   one or more destination floors defined based on an exceptional situation.

10. The access control system according to claim 1, wherein the detection of the user further comprises identification of an authorized user based on the received image data and prestored data associated with the authorized users by using facial recognition-based identification.

11. The access control system according to claim 10, wherein the at least two destination floors comprise:
   one or more default destination floors defined based on a time of day;
   one or more destination floors defined based on a current traffic flow;
   one or more destination floors defined based on an exceptional situation;
   one or more default destination floors assigned for said authorized user;
   one or more destination floors set by the said authorized user;
   one or more destination floors defined based on previously selected destination floors by said authorized user; and/or
   a destination floor defined based on a scheduled event for said authorized user, wherein the scheduled event is obtained from an external storage unit to which the scheduled event is stored.

12. An elevator system comprising:

at least two elevator cars each travelling along a respective elevator shaft;

an elevator control system; and the access control system according to claim 1 comprising at least one gate device.

13. A method for controlling the access control system according to claim 1, the method comprising:

receiving image data from at least one imaging device;

detecting a user approaching a gate device based on the received image data;

obtaining destination floor information comprising at least two destination floors;

controlling at least one indication device to provide a first visual indication comprising the at least two destination floors; and detecting a destination floor selected by the user from among the at least two destination floors based on sensor data received from at least one sensor device.

14. The method according to claim 13, wherein the providing of the first visual indication comprises projecting the first visual indication on a surface in a vicinity of the gate device, and wherein the first visual indication comprises an indication element for each of the at least two destination floors.

15. The method according to claim 14, wherein the detecting the destination floor selected by the user comprises detecting at least partial deformation of at least one indication element, wherein:

if one indication element with at least partial deformation is detected, said one indication element represents the destination floor selected by the user; or if two or more indication elements with at least partial deformation are detected, the indication element with a greater deformation represents the destination floor selected by the user, or no selection by the user is detected.

16. The method according to claim 13 further comprising providing the detected destination floor selection by the user to an external database and/or an elevator control system.

17. The method according to claim 16 further comprising generating an elevator call to allocate an elevator car to the destination floor selected by the user in response to receiving the detected destination floor selection by the user.

18. The method according to claim 17 further comprising receiving an elevator car identification information of the elevator car to which an elevator call is generated from the elevator control system.

19. The method according to claim 16, wherein the method further comprises providing to the elevator control system an elevator car identification information of an elevator car for generating an elevator call to allocate said elevator car to the destination floor selected by the user.

20. The method according to claim 18 further comprising:

controlling the at least one indication device to project a second visual indication on a surface in a vicinity of the gate device or the user, wherein the second visual indication comprises the elevator car identification information; and/or controlling one or more displays to display the elevator car identification information.

21. The method according to claim 13, wherein the at least two destination floors comprise:

one or more default destination floors defined based on a time of day;

one or more destination floors defined based on a current traffic flow; and/or one or more destination floors defined based on an exceptional situation.

22. The method according to claim 13, wherein the step of detecting the user further comprises identifying an authorized user based on the received image data and prestored data associated with authorized users by using facial recognition-based identification.

23. The method according to claim 22, wherein the at least two destination floors comprise:

one or more default destination floors defined based on a time of day;

one or more destination floors defined based on a current traffic flow;

one or more destination floors defined based on an exceptional situation;

one or more default destination floors assigned for said authorized user;

one or more destination floors set by the said authorized user;

one or more destination floors defined based on previously selected destination floors by said authorized user; and/or a destination floor defined based on a scheduled event for said authorized user, wherein the scheduled event is obtained from an external storage unit to which the scheduled event is stored.

\* \* \* \* \*